United States Patent [19]

Dolzhenkov

[11] 4,328,958
[45] May 11, 1982

[54] APPARATUS FOR STIRRING MOLTEN METAL IN CONTAINER

[76] Inventor: Boris S. Dolzhenkov, ulitsa Aerodromnaya, 87, kv. 2, Kuibyshev, U.S.S.R.

[21] Appl. No.: 195,199
[22] PCT Filed: May 15, 1979
[86] PCT No.: PCT/SU79/00025
§ 371 Date: Apr. 7, 1980
§ 102(e) Date: Apr. 7, 1980
[87] PCT Pub. No.: WO80/00364
PCT Pub. Date: Mar. 6, 1980

[30] Foreign Application Priority Data

Aug. 7, 1978 [SU] U.S.S.R. .................. 265440

[51] Int. Cl.³ .................. C21C 7/00; C22B 9/00
[52] U.S. Cl. .................. 266/233; 75/61; 75/93 R
[58] Field of Search .......... 266/233; 75/61, 93 R

[56] References Cited

U.S. PATENT DOCUMENTS

| | | | |
|---|---|---|---|
| 3,278,295 | 10/1966 | Ostberg | 75/61 |
| 3,802,872 | 4/1974 | Ostberg | 75/61 |
| 3,972,709 | 8/1976 | Chiu | 75/93 R |
| 3,973,763 | 8/1976 | Steinke | 266/233 |
| 4,046,559 | 9/1977 | Crimes | 75/93 R |
| 4,235,626 | 11/1980 | Semin et al. | 266/233 |

Primary Examiner—P. D. Rosenberg
Attorney, Agent, or Firm—Robert E. Burns; Emmanuel J. Lobato; Bruce L. Adams

[57] ABSTRACT

An apparatus comprises a refractory-lined pipe (5) with a removable cover (6) formed with an opening provided to communicate the interior of the pipe (5) with a compressed gas supply system (8) and a vacuum system (9). This pipe (5) is arranged in a stepped conduit (4) of a tubular structure (3) from a refractory material. Positioned beneath the lower end of the pipe (5) and coaxially therewith on a stepped protection (10) of the wall of the conduit (4) formed in the structure (3) is a sleeve (11) from a porous material. Formed between the external side surface of the sleeve (11) and the wall of the conduit (4) is an annular space (12) confined from below by an annular cover (16) with an opening (17) for communicating the space (12) with a refining gas supply source (18).

4 Claims, 1 Drawing Figure

U.S. Patent May 11, 1982 4,328,958
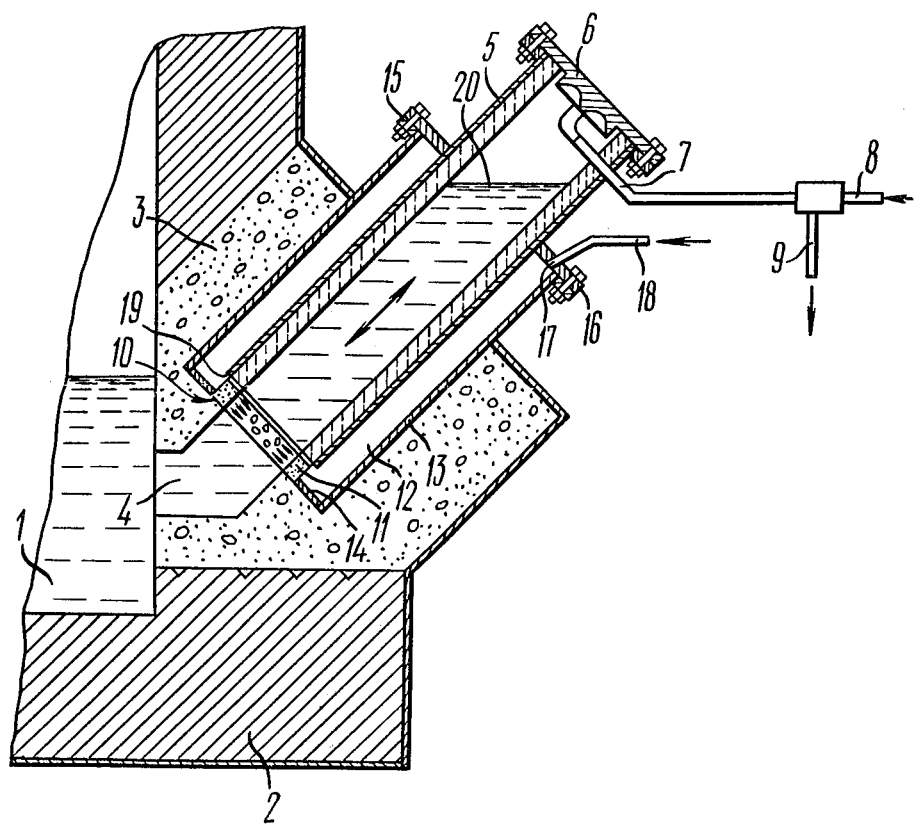

APPARATUS FOR STIRRING MOLTEN METAL IN CONTAINER

TECHNICAL FIELD OF THE INVENTION

The present invention relates to metallurgy, and more particularly, to an apparatus for stirring molten metal in a container, e.g. directly in the bath of a melting or holding furnace during its melting or vacuum degassing. Such stirring is advantageously effected to enhance the rate of melting and vacuum degassing, as well as to maintain uniformity of composition or temperature in a standing body of molten metal.

BACKGROUND ART

A variety of devices have been used for stirring molten metal directly in the bath of a melting or holding furnace. This invention proposes a device for gas dynamical stirring of molten metals, such as aluminum and its alloys, which is both effective in operation and simple in construction.

A device for stirring molten metal usually comprises a refractory-lined pipe with a removable cover, a system for feeding compressed air into the pipe interior, and a system for building up vacuum therein.

This type of device is mounted in the wall of a melting unit through a port, disposed above the level of molten metal, in a manner to permit the lower end of the pipe to be immersed in the melt. The device incorporates level gauges connected to the control circuit of the compressed gas supply system and vacuum building-up system. This device is similar in operation to a pump or ejector which uses a pulse of compressed gas acting on the entire body of molten metal. The procedure of stirring a body of molten metal comprises the steps of alternately withdrawing molten metal upwardly from the body in a confined space to a level above the body and expelling the withdrawn molten metal into the body as a submerged high velocity jet. The alternate metal-withdrawing and metal-expelling steps are effected by alternately applying suction and gaseous fluid (gas) under pressure in the confined space above the body of molten metal. The jet of expelled metal creates turbulence in the body of molten metal and thus effects its stirring.

The prior-art method makes it possible to enhance production efficiency of a melting or holding furnace. In addition, the quality of metal being stirred is improved by maintaining uniform chemical composition and temperature throughout the melt bath. Jets of molten metal forcefully expelled from the ejector are poured over lumps of solid charge in a furnace to thereby enable their rapid melting.

On being tapped from a melting or holding furnace, the molten metal is further subjected to refining by means of gas, for example, argon.

However, gas-dynamic pumps used for stirring molten metal fail to ensure optimum conditions for obtaining hihg-quality metal by way of reducing the amount of gas, as well as slag and oxide inclusions contained therein.

Attempts to effect refining of metal by applying a pulse of compressed gas thereto have ended so far in failure by reason of extremely short time of contact between gas and the surface of metal jet in the interior of a stirrer pipe during metal-expelling procedure.

U.S. Pat. No. 3,895,937 discloses a method according to which a jet of molten metal discharged from a melting furnace into a vacuum holding furnace is rifined by means of gas. However, this method also fails to ensure sufficiently high quality of metal due to a short time period during which refininf gas remains in contact with molten metal.

The known devices currently used for stirring and refining molten metal fail to meet ever growing demands for higher throughout capacity of melting furnaces and improved quality of metal. In other words, more sophisticated devices are needed today to satisfy increasing demands of modern industry.

Moreover, a demand has arisen for high-purity metals intended for the manufacture of vital units and parts to find wide application, for instance, in the aircraft industry.

SUMMARY OF THE INVENTION

It is therefore an object of the present invention to obviate the above disadvantages.

The invention has as its aim the provision of an apparatus for stirring molten metal in a container and of such construction that will permit simultaneous stirring and refining of this metal.

This aim is attained in an apparatus for stirring molten metal in a container, comprising a refractory-lined pipe with a removable cover fitted with an opening provided to communicate the interior of the pipe with a compressed gas supply means and with a vacuum system, wherein the pipe is arranged in a stepped conduit of a tubular structure formed of refractory material, and wherein positioned below the lower end of the pipe and coaxially therewith on the stepped projection of the conduit wall is a sleeve made of a porous material, the external side surface of said sleeve and the conduit wall forming an annular space confined from below by the projection and from above by an annular cover with an opening for communicating this space with the compressed gas supply means.

Such apparatus construction permits effective stirring of molten metal. Combining metal stirring and refining operations would permit enhanced production efficiency of melting units and improved quality of metal. Furthermore, melting units are rendered more reliable and easier in operation; to additional equipment is required. Also, the stirrer pipe incorporated in such apparatus lends itself easily for replacement.

It is advantageous that the above-mentioned sleeve be formed of spongly titanium.

This type of sleeve is simple in construction and permits easy passage of gas. It also has adequate heat-resisting properties and serves as a good catalyst during metal refining process.

It is preferable that a packing from a heat-resistant material, such as kaolin or asbestos wool, be provided between the lower end of the pipe and the sleeve.

Such packing will assure reliable operation of the apparatus by absorbing dynamic loads, and will facilitate the pipe removal.

The walls of the conduit of the tubular structure are preferably encased in a metallic shell formed with an annular bottom and having its lower end formed with a flange carrying the annular cover.

This will allow refining gas to be supplied through the sleeve made of porous material, with the resultant increased efficiency of the refining process. Moreover, such apparatus construction will facilitate assembly and disassembly operations.

BRIEF DESCRIPTION OF THE DRAWING

The invention will be further described, by way of example only, with reference to the accompanying drawing in which the sole FIGURE is a vertical section showing an apparatus for stirring molten metal, and a container for the molten metal. The direction of metal and gas flows is indicated by arrows.

PREFERRED EMBODIMENT OF THE INVENTION

The illustrated apparatus for stirring a molten metal I in the bath of a melting furnace 2 (or holding furnace) comprises a tubular structure 3 manufactured from a refractory material, such as refractory concrete. The tubular structure 3 is formed with a stepped conduit 4 accommodating a refractory-lined pipe 5 with a removable cover 6. The tubular structure 3 is mounted for easy replacement in the wall of the furnace 2 (melting or holding). The interior of the pipe 5 communicates through an opening 7, provided in the wall or in the cover 6, with a compressed gas supply system 8 and with a vacuum system 9. The control circuit of these systems is not shown, as it is similar to that provided in any conventional gas pump. Arranged underneath the lower end of the pipe 5 and coaxially therewith on a stepped projection 10 of the wall of the conduit 4 is a sleeve II formed of a porous material, such as spongy titanium, which can serve as a catalyst in the process of refining aluminum or its alloys. The pipe 5 and sleeve II are positioned in the conduit 4 of the tubular structure 3 with an annular space 12 formed therebetween- At the place of disposition of the pipe 5, the wall of the conduit 4 of the tubular structure 3 is encased in a metallic shell 13 formed with an annular bottom 14 adjoining the stepped projection 10 of the wall of the conduit 4. The upper end of the shell 13 is formed with a flange 15 having the pipe 5 fixed thereto with the aid of an annular cover 16. The annular cover 16 is fitted to confine the space 12 from top. The cover 16 is formed with an opening 17 provided to communicate the space 12 with a source 18 of supplying refining gas. The refininf gas supply source 18 can be provided either as an independant system or else can be connected to the compressed gas supply system 8 through a pressure regulator (not shown). It is possible to maintain preset temperature conditions required for effective treatment of metal by heating or cooling gas in the gas supply system 8. Such temperature control system may be of any conventional design and therefore is not herein disclosed. The gas supply source 18 is brought in communication through the opening 17 with the space 12 and further through the sleeve II with the interior of the pipe 5 for treating molten metal with refining gas. The sleeve II is positioned below the minimum level of metal in the bath of the furnace 2 with the view to ensuring effective stirring of metal. Placed between the sleeve II and the end of the pipe 5 is a packing 19 formed of a heat-resistant resilient material, such as kaolin or asbestos wool, which also facilitates the removal of the pipe 5. The sleeve II may be stuck to the structure 3 by means of a heat-resistant composition. A maximum level 20 to which the metal I may rise in the pipe 5 is shown with regard to those cases when the apparatus of the invention is adapted to application at the melting furnace 2.

The apparatus operates in the following manner.

At a minimum permissible level of the metal I in the furnace 2, when the metal covers the lower outlet opening of the pipe 5 and the sleeve II, the vacuum system 9 is brought in communication with the interior of the pipe 5, and refining gas is fed at a preset temperature and pressure from the source 18 into the space 12 and further through the sleeve II into the metal. Under the action of vacuum the molten metal I is raised in the pipe 5 to reach the level 20. If the apparatus is employed at a vacuum holding furnace, the level of the metal I will be the same in the interior of the pipe 5 and in the furnace bath. Thereafter, the vacuum system 9 is cut off and the compressed gas supply system 8 is operated to apply a pulse of compressed gas to the portion of metal treated with refining gas, which is thereby expelled into the bath of the furnace 2. Then, another portion of the molten metal I is again sucked into the interior of the pipe 5 to be treated with refining gas therein and to be further expelled therefrom. Thus the metal stirring procedure is combined with the metal refining process to continue until finished metal of a preset composition is obtained.

COMMERCIAL APPLICABILITY

The apparatus of the invention has been tested to show high operating efficiency and to allow the amount of gas and other inclusions in the metal under treatment to be reduced from 15 to 20 percent, as compared with pumps of conventional construction.

The proposed apparatus is readily applicable to both holding and melting furnaces used to produce high-purity metals required for the manufacture of vital parts and units to meet the increasing demand of the aircraft industry, machine-building industry and other related industries.

What is claimed is:

1. An apparatus for stirring molten metal in a container, comprising a refractory-lined pipe with a removable cover fitted with an opening provided to communicate the interior of the pipe with a compressed gas supply means and with a vacuum system, characterized in that the pipe (5) is arranged in a stepped conduit (4) of a tubular structure (3) formed of refractory material, and wherein positioned bellow the lower end of the pipe (5) and coaxially therewith on a stepped projection (10) of the wall of the conduit (4) formed in the structure (3) is a sleeve (II) from a porous material, the external side surface of said sleeve and the wall of the conduit (4) of the structure (3) forming an annular space (12) confined from below by the projection (10) and from above by an annular cover (16) with an opening (17) for communicating the annular space (12) with a refining gas supply system (18).

2. An apparatus as claimed in claim 1, characterized in that the sleeve (II) is formed of spongy titanium.

3. An apparatus as claimed in claim 1, characterized in that a packing (19) from a heat-resistant resilient material, such as kaolin or asbestos wool, is provided between the lower end of the pipe (5) and the sleeve (II).

4. An apparatus as claimed in claim 1, characterized in that at the place of disposition of the pipe (5) and the sleeve (II) the walls of the conduit (4) of the tubular structure (3) are encased by a metallic shell (13) formed with an annular bottom (14) and having its upper end provided with a flange (15) carrying the annular cover (16) confining the annular space (12).

* * * * *